(12) United States Patent
Annerino et al.

(10) Patent No.: US 9,502,701 B1
(45) Date of Patent: Nov. 22, 2016

(54) ELECTRONIC DEVICE

(71) Applicant: Wistron Corporation, New Taipei (TW)

(72) Inventors: Frank Annerino, New Taipei (TW); Jonathan Wollak, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/835,699

(22) Filed: Aug. 25, 2015

(51) Int. Cl.
*H01M 2/02* (2006.01)
*H01M 2/10* (2006.01)

(52) U.S. Cl.
CPC ....... *H01M 2/1066* (2013.01); *H01M 2220/30* (2013.01)

(58) Field of Classification Search
CPC .................................................... H01M 2/02
See application file for complete search history.

(56) References Cited

U.S. PATENT DOCUMENTS

2011/0076536 A1* 3/2011 Dong ............... G06F 1/1679
429/97

\* cited by examiner

*Primary Examiner* — Jacob Marks
(74) *Attorney, Agent, or Firm* — Winston Hsu; Scott Margo

(57) ABSTRACT

An electronic device includes a battery module, a casing and a latching mechanism. The battery module has at least one battery retention tab. A battery compartment is formed on the casing. The battery module is detachably installed in the battery compartment, and the casing has a stopping structure. The latching mechanism is slidably installed on the casing and includes a latching cover, a lock member and a resilient member. The latching cover is installed on the casing in a slidable manner. The lock member is pivoted to the latching cover. The resilient member is installed on the latching cover. When the latching cover slides to the lock position, the resilient member forces the lock member to engage with the stopping structure, so as to fix the latching cover in the lock position.

14 Claims, 7 Drawing Sheets

ELECTRONIC DEVICE

BACKGROUND OF THE INVENTION

1. Field of the Invention

The present invention relates to an electronic device, and more particularly, to an electronic device with mechanisms for withstanding impacts without unlocking a battery module.

2. Description of the Prior Art

A portable electronic device, such as a mobile phone, a tablet computer and so on, is equipped with a battery module as a power supply. Conventionally, the battery module is installed in a battery compartment of a rear housing and is covered by a battery cap. When the electronic device is applied by impacts, such as collision with an object, the battery module may drop out from the rear housing, resulting in damage of the battery module or operating system of the electronic device due to sudden interruption of power supply.

SUMMARY OF THE INVENTION

The present invention provides an electronic device with mechanisms for withstanding impacts without unlocking a battery module for solving above drawbacks.

According to an embodiment of the present invention, an electronic device includes a battery module, a casing and a latching mechanism. The battery module has at least one battery retention tab. A battery compartment is formed on the casing. The battery module is detachably installed in the battery compartment, and the casing has a stopping structure. The latching mechanism is slidably installed on the casing and includes a latching cover, a lock member and a resilient member. The latching cover is installed on the casing in a slidable manner and has at least one latching retention tab. The at least one latching retention tab engages with the at least one battery retention tab when the latching cover slides to a lock position, and the at least one latching retention tab disengages from the at least one battery retention tab when the latching cover slides to an unlock position. The lock member includes a pivotal portion, a first arm and a second arm. The pivotal portion is pivoted to the latching cover. The first arm protrudes from the pivotal portion. The second arm protrudes from the pivotal portion and is opposite to the first arm. The resilient member is installed on the latching cover. When the latching cover slides to the lock position, the resilient member forces the second arm to rotate the lock member about the pivotal portion in a first rotating direction, such that the first arm is rotated to engage with the stopping structure, so as to fix the latching cover in the lock position.

According to another embodiment of the present invention, an operating opening is formed on the latching cover, and the lock member further includes a button portion protruding from the second arm and exposing via the operating opening. When the button portion is pressed, the button portion forces the second arm to drive the lock member to rotate about the pivotal portion in a second rotating direction opposite to the first rotating direction, such that the first arm is rotated to disengage from the stopping structure.

According to another embodiment of the present invention, the latching cover has a pivotal structure, and the latching mechanism further includes a pivot member for pivoting the pivotal portion to the pivotal structure.

According to another embodiment of the present invention, a length of the first arm is equal to a length of the second arm.

According to another embodiment of the present invention, the latching mechanism further includes a latching plate installing the latching cover on the casing and capable of moving with the latching cover. The latching plate and the latching cover cooperatively hold the resilient member.

According to another embodiment of the present invention, a latch plate guiding channel is formed on the casing, and the resilient member includes a fixing portion and a spring arm protruding from the fixing portion and resiliently abutting against the second arm of the lock member. The latching plate includes a plate body and a first combining portion. The plate body is slidably disposed in the latch plate guiding channel. The first combining portion extends from an end of the plate body and is combined with the fixing portion.

According to another embodiment of the present invention, a first recessed portion and a first through bore communicating with the first recessed portion are formed on the latching cover. A through hole is formed on the fixing portion. A first threaded hole is formed on the first combining portion. The latch mechanism further includes a first connecting member having a first head portion and a first threaded portion connected to the first head portion. The first head portion is contained in the first recessed portion. The first threaded portion is disposed through the first through bore and the through hole and screwed with the first threaded hole.

According to another embodiment of the present invention, a second recessed portion and a second through bore communicating with the second recessed portion are formed on the latching cover. The latching plate further includes a second combining portion extending from another end of the plate body. A second threaded hole is formed on the second combining portion. The latch mechanism further includes a second connecting member having a second head portion and a second threaded portion connected to the second head portion. The second head portion is contained in the second recessed portion. The second threaded portion is disposed through the second through bore and screwed with the second threaded hole.

According to another embodiment of the present invention, the first combining portion bends toward the plate body, such that a first engaging slot is defined between the plate body and the first combining portion. The second combining portion bends toward the plate body, such that a second engaging slot is defined between the plate body and the second combining portion. The casing further has a first wall and a second wall. The first wall slidably engages with the first engaging slot, and the second wall slidably engages with the second engaging slot.

According to another embodiment of the present invention, the casing further has a first top tab, a first bottom platform, a second top tab and a second bottom platform. A first latching cover guiding channel is defined between the first top tab and the first bottom platform. A second latching cover guiding channel is defined between the second top tab and the second bottom platform. The latching cover further has a first sliding tab and a second sliding tab. The first sliding tab is slidably disposed in the first latching cover guiding channel, and the second sliding tab is slidably disposed in the second latching cover guiding channel.

In summary, when the latching cover slides to a lock position, the latching retention tabs of the latching cover engages with the battery engaging slots defined by the battery retention tabs, so as to prevent the battery module from separating from the battery compartment, and the spring arm of the resilient member will force the second arm to rotate the lock member about the pivotal portion in a first rotating direction. Accordingly, the first arm of the lock member is rotated to engage with the stopping structure, such that the whole latching mechanism is engaged and prevents the latching cover from moving. In such a manner, the latching cover is fixed in the lock position for allowing the latching retention tab to stably engaging the battery module in the lock position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
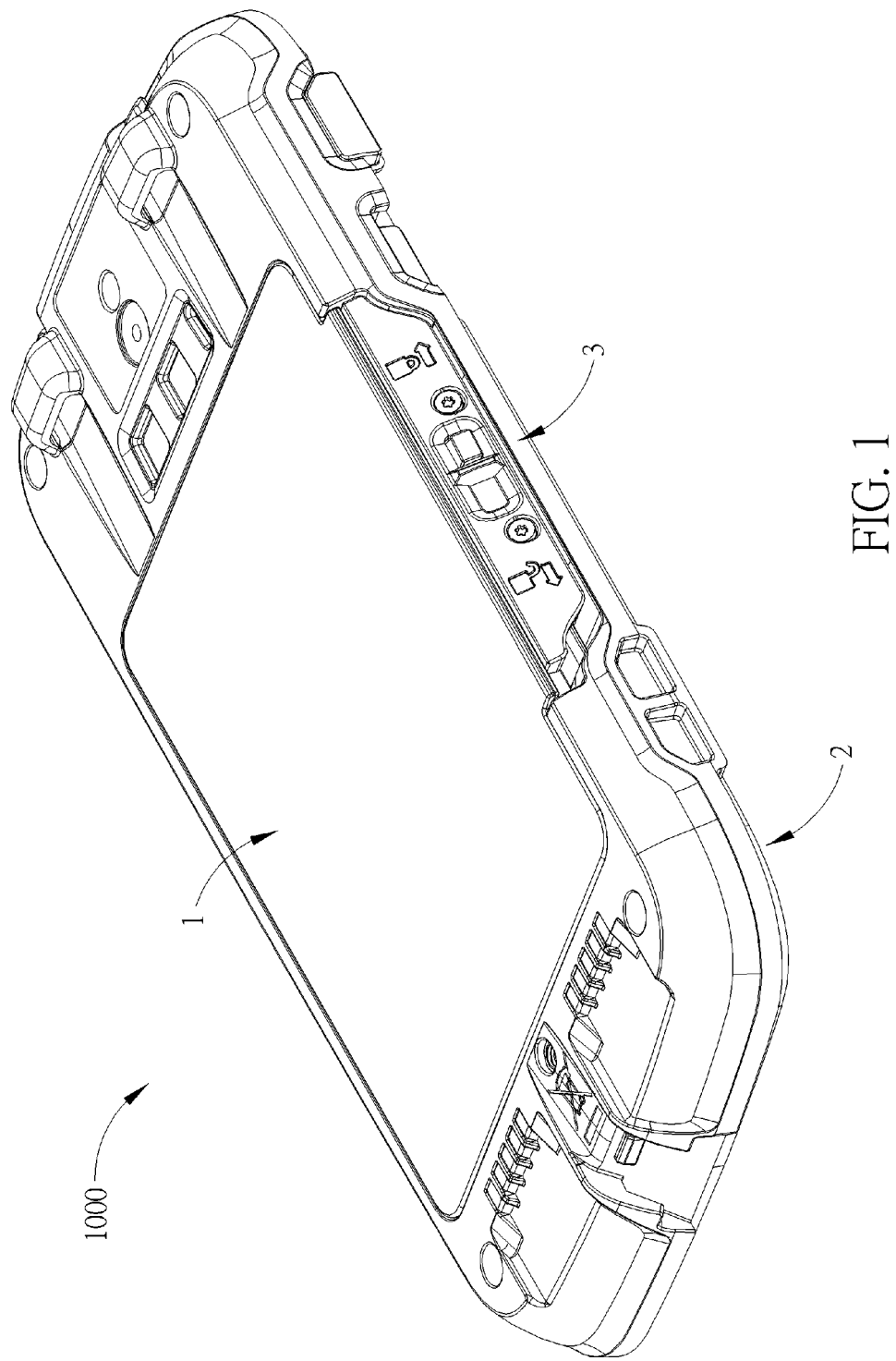
FIG. 1 and FIG. 2 are diagrams of an electronic device in different statuses according to an embodiment of the present invention.
Figure 2:
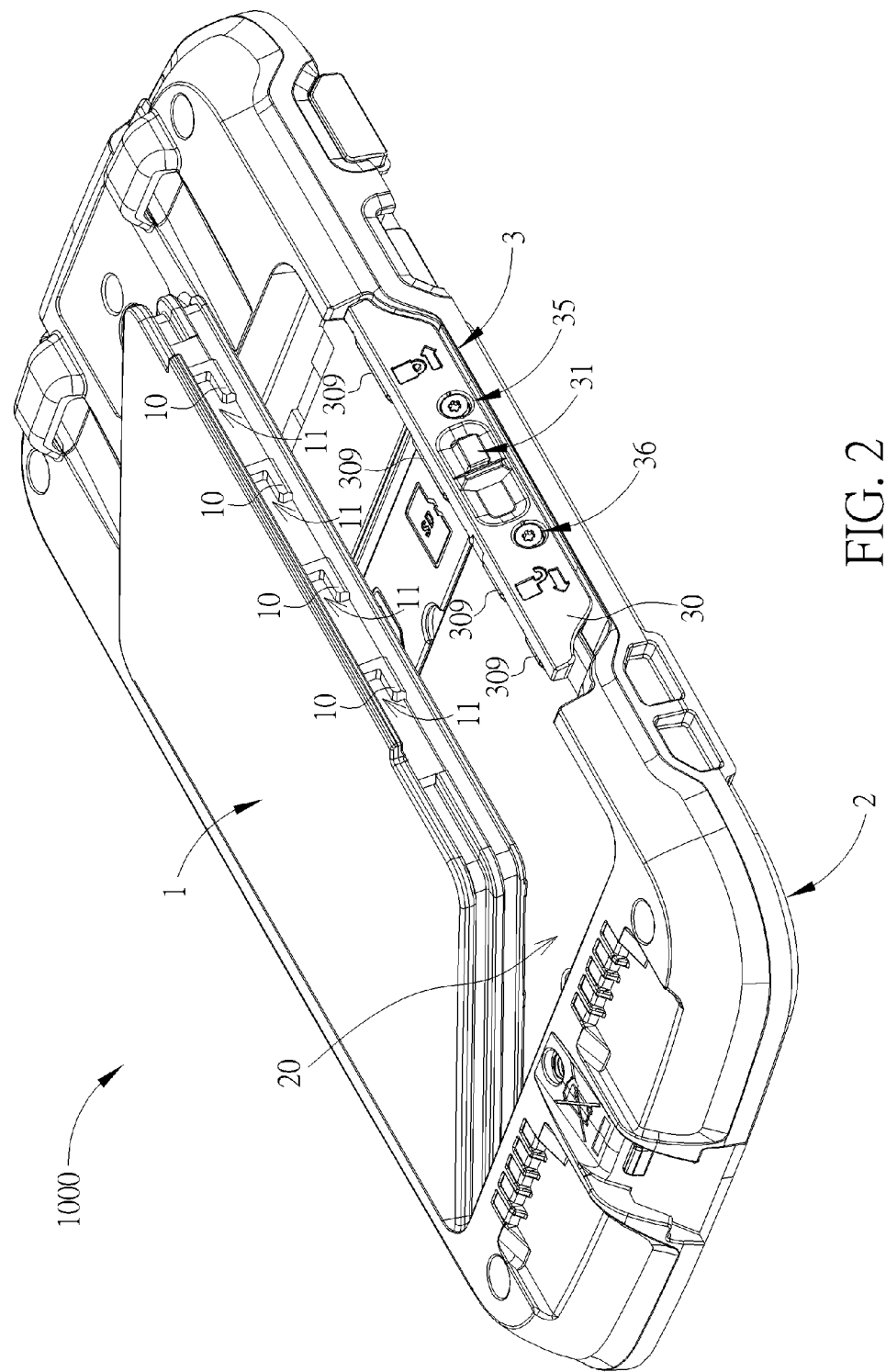

Please refer to FIG. 1 and FIG. 2. FIG. 1 and FIG. 2 are diagrams of an electronic device 1000 in different statuses according to an embodiment of the present invention. As shown in FIG. 1 and FIG. 2, the electronic device 1000 includes a battery module 1, a casing 2 and a latching mechanism 3. A battery compartment 20 is formed on the casing 2, and the battery module 1 is detachably installed in the battery compartment 20. The latching mechanism 3 is slidably installed on the casing 2. When the latching mechanism 3 slides to a lock position shown in FIG. 1, the latching mechanism 3 is able to lock the battery module 1 in the battery compartment 20. When the latching mechanism 3 slides to an unlock position shown in FIG. 2, the latching mechanism 3 releases the battery module 1, such that the battery module 1 is able to detach from the battery compartment 20. In this embodiment, the electronic device 1000 is a portable electronic device, such as a mobile phone, a tablet computer and so on, but the present invention is not limited thereto.

Figure 3:
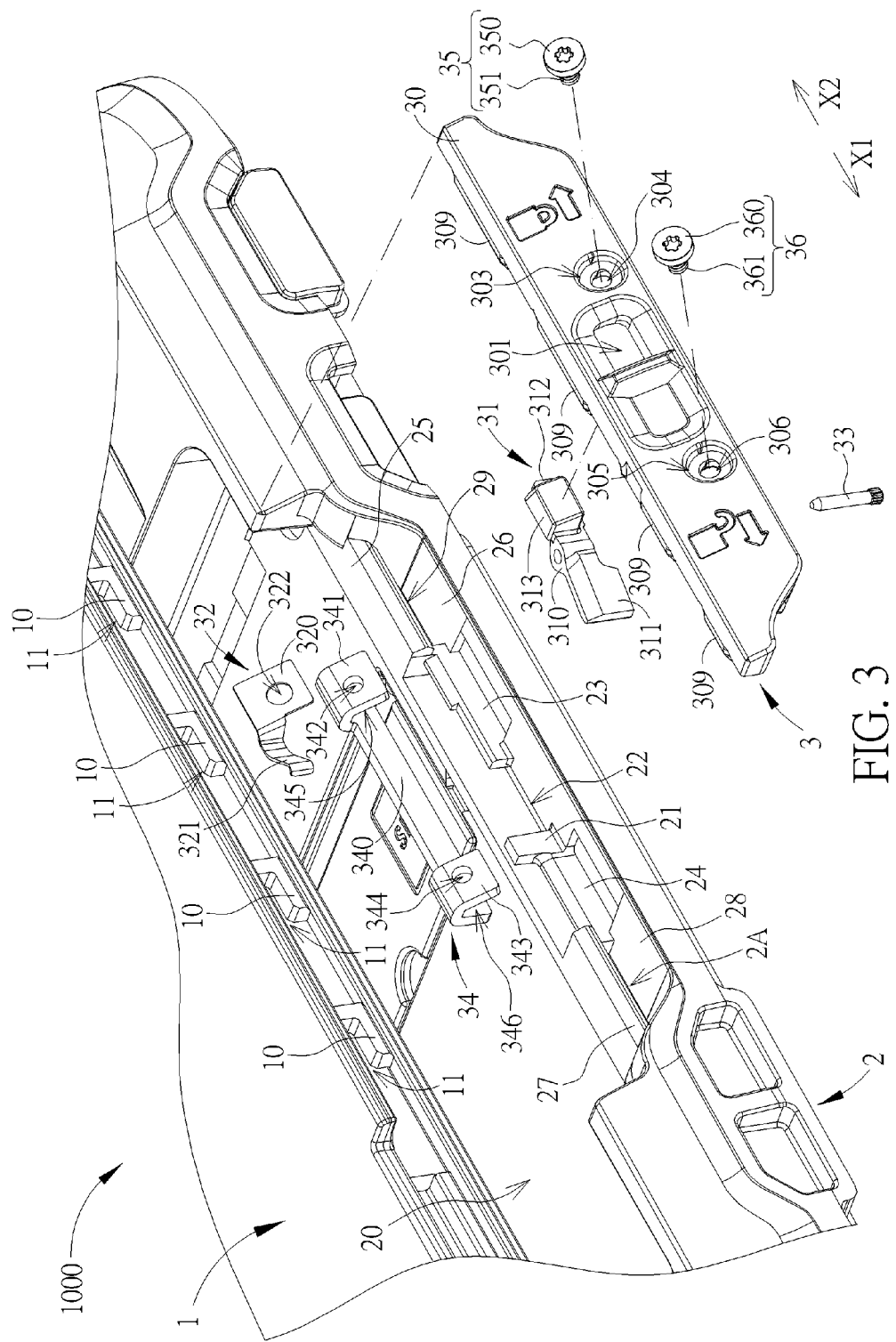
FIG. 3 is a partly exploded diagram of the electronic device according to the embodiment of the present invention.

Please refer to FIG. 3. FIG. 3 is a partly exploded diagram of the electronic device 1000 according to the embodiment of the present invention. As shown in FIG. 3, the casing 2 has a first top tab 25, a first bottom platform 26, a second top tab 27 and a second bottom platform 28. A first latching cover guiding channel 29 is defined between the first top tab 25 and the first bottom platform 26, and a second latching cover guiding channel 2A is defined between the second top tab 27 and the second bottom platform 28. The latching mechanism 3 includes a latching cover 30 and a latching plate 34. The latching cover 30 has a first sliding tab 307 and a second sliding tab 308. The first sliding tab 307 is slidalby disposed in the first latching cover guiding channel 29, and the second sliding tab 308 is slidalby disposed in the second latching cover guiding channel 2A, such that the latching cover 30 is able to be installed on the casing 2 in a slidable manner.

The latching plate 34 is used for installing the latching cover 30 on the casing 2. Furthermore, a latch plate guiding channel 22 is further formed on the casing 2, and the latching plate 34 includes a plate body 340, a first combining portion 341 and a second combining portion 343. The plate body 340 is slidably disposed in the latch plate guiding channel 22. The first combining portion 341 extends from an end of the plate body 340, and the second combining portion 343 extends from another end of the plate body 340. The first combining portion 341 and the second combining portion 343 are combined with the latching cover 30, such that the latching plate 34 is capable of moving with the latching cover 30. In this embodiment, the latching cover 30 has its own guiding channels (i.e., the first latching cover guiding channel 29 and the second latching cover guiding channel 2A), and the latching plate 34 has its own guiding channel (i.e., the latch plate guiding channel 22) as well. As a result, the structural design of the above-mentioned two set guiding channels facilitates sliding stability when the latching cover 30 and the latching plate 34 simultaneously slide on the casing 2.

In this embodiment, the plate body 340, the first combining portion 341 and the second combining portion 343 are integrally formed in a stamping manner, i.e., the first combining portion 341 is able to bend toward the plate body 340 and the second combining portion 343 is able to bend toward the plate body 340 in the stamping process, such that a first engaging slot 345 is defined between the plate body 340 and the first combining portion 341, and a second engaging slot 346 is defined between the plate body 340 and the second combining portion 343. In addition, the casing 2 further has a first wall 23 and a second wall 24. The first wall 23 slidably engages with the first engaging slot 345, and the second wall 24 slidably engages with the second engaging slot 346. Accordingly, the first wall 23 is able to cooperate with the second top tab 27 for preventing the latching plate 34 as well as the latching cover 30 from dropping over along a direction perpendicular to a sliding direction (i.e., a first sliding direction X1 and a second sliding direction X2 shown in FIG. 3) of the latching plate 34 and the latching cover 30.

Figure 4:
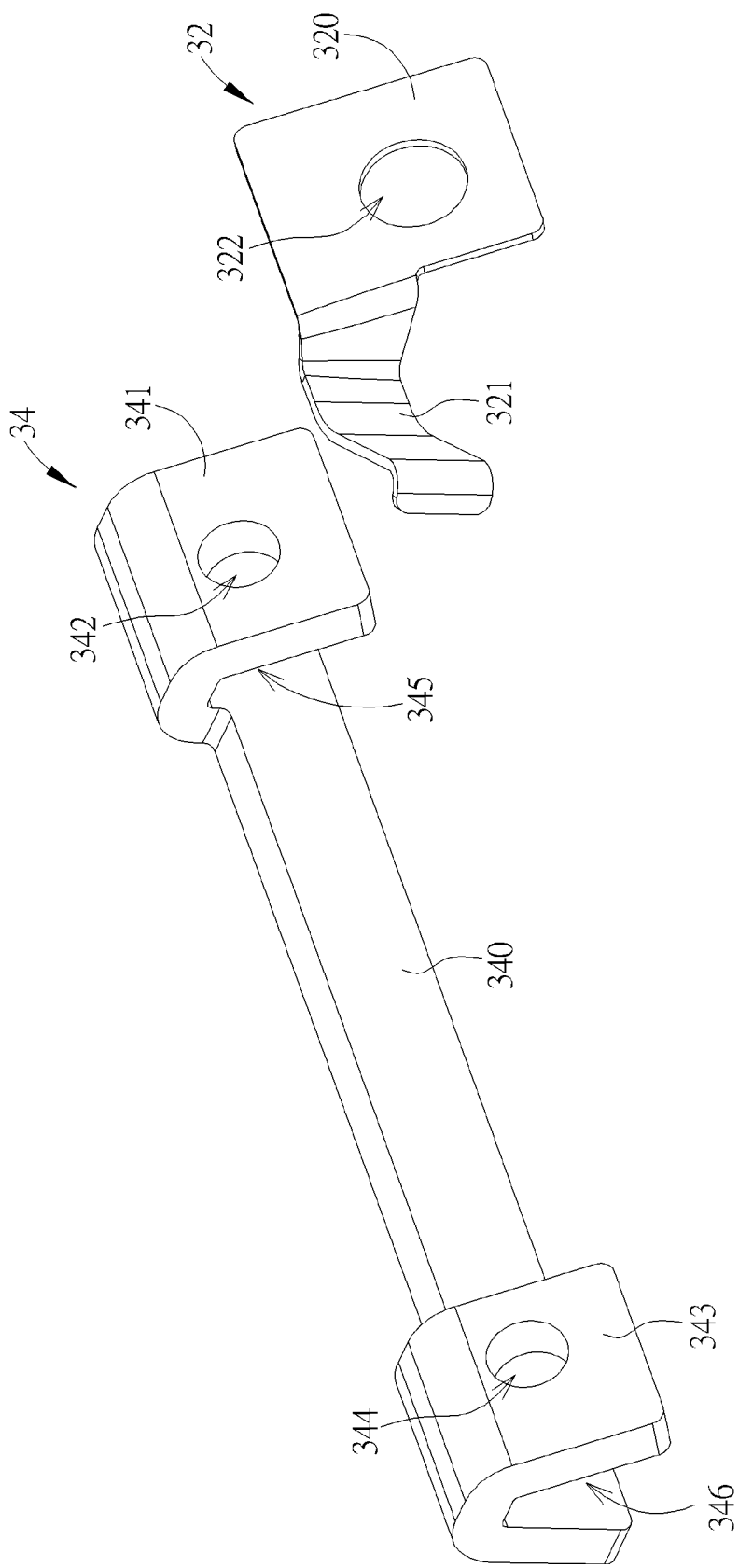
FIG. 4 is an exploded diagram of a latching plate and a resilient member according to the embodiment of the present invention.

As shown in FIG. 3, the latching mechanism 3 further includes a resilient member 32 installed on the latching cover 30. Please refer to FIG. 3 and FIG. 4. FIG. 4 is an exploded diagram of the latching plate 34 and the resilient member 32 according to the embodiment of the present invention. As shown in FIG. 3 and FIG. 4, the first combining portion 341 of the plate body 340 and the latching cover 30 cooperatively hold the resilient member 32. The resilient member 32 includes a fixing portion 320 and a spring arm 321 protruding from the fixing portion 320. In practical application, the fixing portion 320 can be welded to the first combining portion 341 for combining the first combining portion 341 with the fixing portion 320.

Furthermore, a first recessed portion 303 and a first through bore 304 communicating with the first recessed portion 303 are formed on the latching cover 30, a through hole 322 is formed on the fixing portion 320 of the resilient member 32, and a first threaded hole 342 is formed on the first combining portion 341 of the latching plate 34. In addition, a second recessed portion 305 and a second through bore 306 communicating with the second recessed portion 305 are formed on the latching cover 30, and a second threaded hole 344 is formed on the second combining portion 343 of the latching plate 34.

As shown in FIG. 3, the latching mechanism 3 further includes a first connecting member 35 and a second connecting member 36. In this embodiment, the first connecting member 35 and the second connecting member 36 are a screw, respectively, and the screws (i.e., the first connecting member 35 and the second connecting member 36) are used for screwing the latching cover 30 with the latching plate 34. Thus, the first connecting member 35 has a first head portion 350 and a first threaded portion 351 connected to the first head portion 350, and the second connecting member 36 has a second head portion 360 and a second threaded portion 361 connected to the second head portion 360.

When the screws (i.e., the first connecting member 35 and the second connecting member 36) screw the latching cover 30 with the latching plate 34, the first head portion 350 and the second head portion 360 are respectively contained in the first recessed portion 303 and the second recessed portion 305, such that the first head portion 350 and the second head portion 360 do not protrude from an outer surface of the latching cover 30, so as to keep integrity of appearance of the latching cover 30. In addition, the first threaded portion 351 of the first connecting member 35 is disposed through the first through bore 304 of the latching cover 30 and the through hole 322 of the resilient member 32 and then screwed with the first threaded hole 342 on the first combining portion 341, and the second threaded portion 361 of the second connecting member 36 is disposed through the second through bore 306 of the latching cover 30 and the screwed with the second threaded hole 344 on the second combining portion 343. In such a manner, the latching plate 34 is combined with the latching cover 30 and capable of moving with the latching cover 30.

Figure 5:
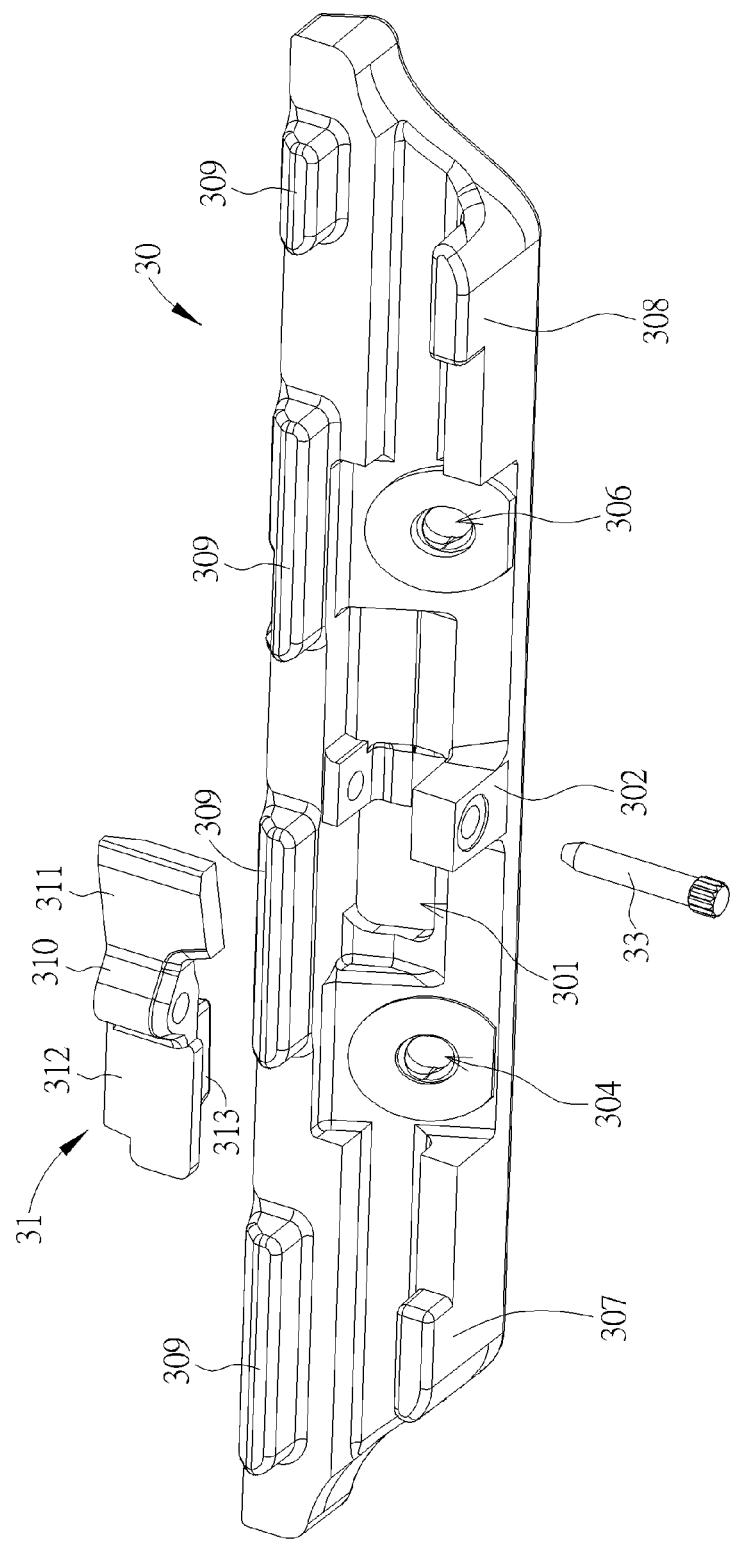
FIG. 5 is an exploded diagram of a latching cover, a lock member and a pivot member in another view according to the embodiment of the present invention.

As shown in FIG. 3, the casing 2 further has a stopping structure 21, the latching cover 30 has a pivotal structure 302, and the latching mechanism 3 further includes a lock member 31 and a pivot member 33. Please refer to FIG. 3 and FIG. 5. FIG. 5 is an exploded diagram of the latching cover 30, the lock member 31 and the pivot member 33 in another view according to the embodiment of the present invention. As shown in FIG. 3 and FIG. 5, the lock member 31 includes a pivotal portion 310, a first arm 311, a second arm 312 and a button portion 313, and an operating opening 301 is formed on the latching cover 30. The pivot member 33 is a pin and is used for pivoting the pivotal portion 310 of the lock member 31 to the pivotal structure 302 of the latching cover 30, such that the lock member 31 is pivoted to the latching cover 30.

Furthermore, the first arm 311 protrudes from pivotal portion 310. The second arm 312 protrudes from pivotal portion 310 and is opposite to the first arm 311. The button portion 313 protrudes from the second arm 312 and exposes via the operating opening 301, such that the button portion 313 of the lock member 31 is exposed on the outer surface of the latching cover 30. In addition, the spring arm 321 of the resilient member 32 resiliently abuts against the second arm 312 of the lock member 31.

Figure 6:
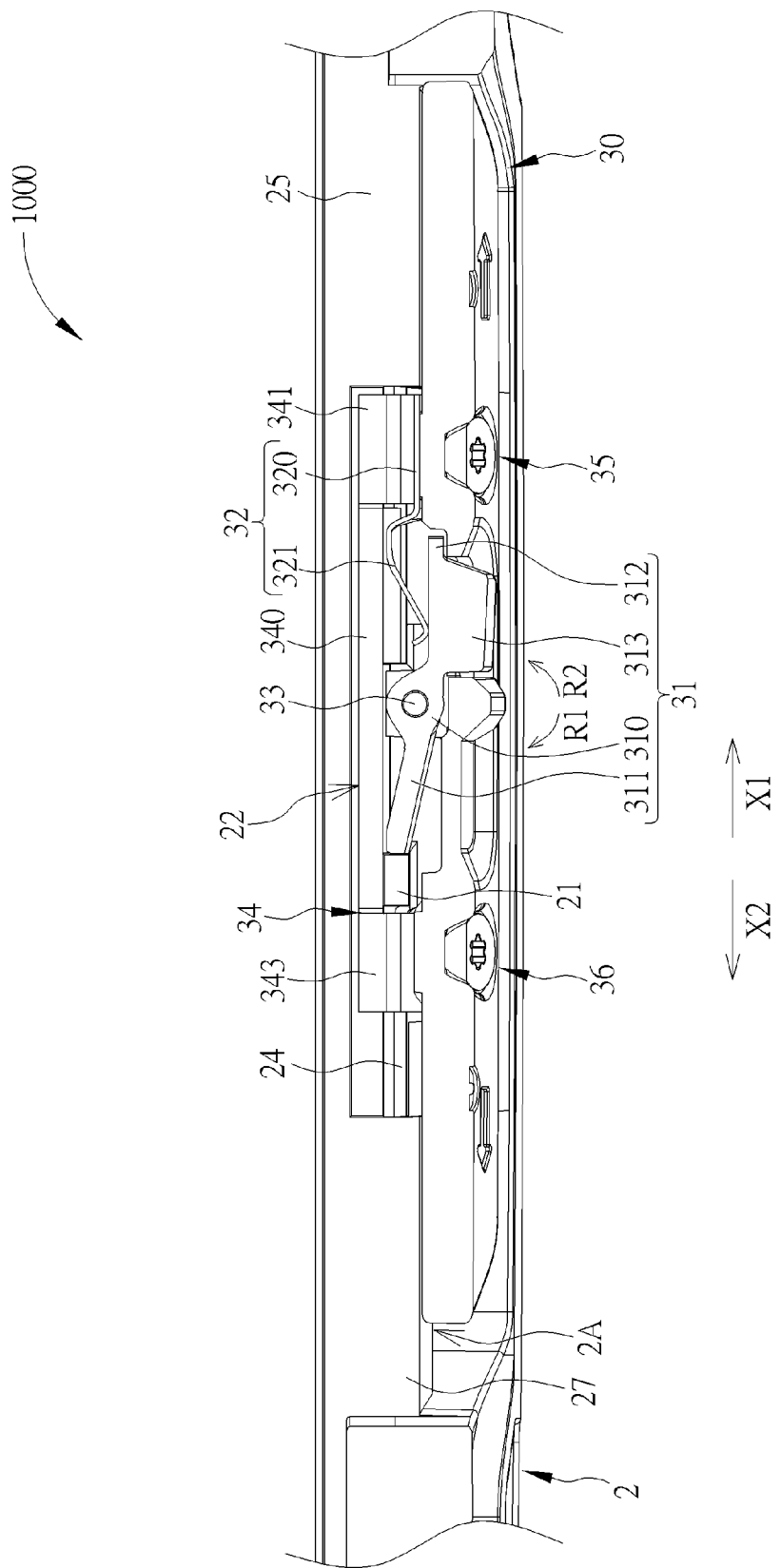
FIG. 6 is a sectional diagram of the electronic device in a lock status according to the embodiment to the present invention.
Figure 7:
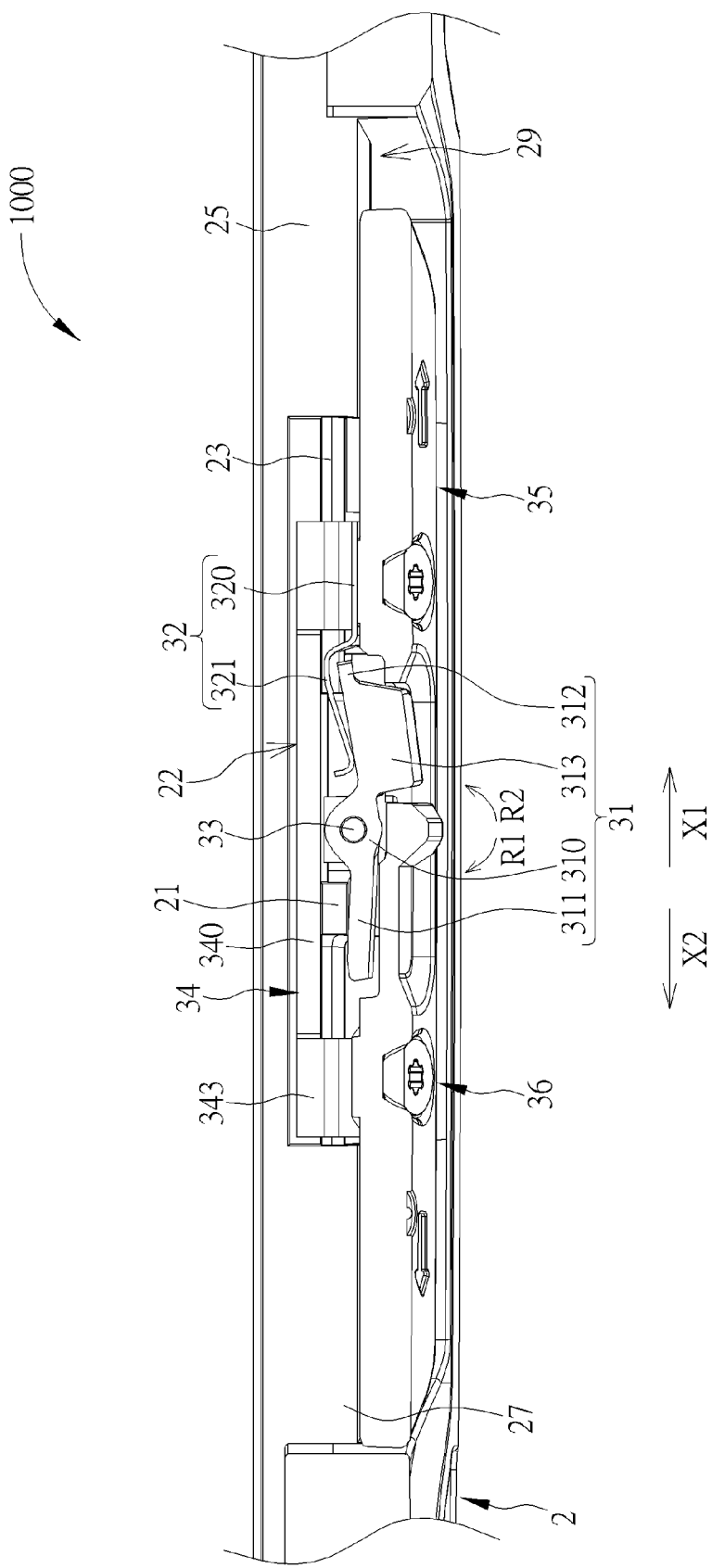
FIG. 7 is a sectional diagram of the electronic device in an unlock status according to the embodiment to the present invention.

Please refer to FIG. 1, FIG. 2, FIG. 6 and FIG. 7. FIG. 6 is a sectional diagram of the electronic device 1000 in a lock status according to the embodiment to the present invention. FIG. 7 is a sectional diagram of the electronic device 1000 in an unlock status according to the embodiment to the present invention. As shown in FIG. 1, FIG. 2, FIG. 6 and FIG. 7, the battery module 1 has four battery retention tabs 10, and the latching cover 30 further has four latching retention tabs 309 corresponding to the four battery retention tabs 10. Further, the four battery retention tabs 10 define four battery engaging slots 11, as shown in FIG. 2. Amounts and disposal positions of the battery retention tab 10 and the latching retention tab 309 are not limited to those illustrated in figures in this embodiment. For example, the battery module 1 can have only one battery retention tab 10, and the latching cover 30 can have only one latching retention tab 309 as well, i.e., structures of the battery module 1 having at least one battery retention tab 10 and the latching cover 30 having at least one latching retention tab 309 are within the scope of the present invention.

When the battery module 1 is desired to be installed in the battery compartment 20 on the casing 2, the battery module 1 need to be placed into the battery compartment 20 from a position in FIG. 2 to a position in FIG. 1. Afterwards, the latching cover 30 is slid in a first sliding direction X1 to a lock position shown in FIG. 6. As a result, the latching retention tabs 309 of the latching cover 30 engages with the battery engaging slots 11 defined by the battery retention tabs 10, so as to prevent the battery module 1 from separating from the battery compartment 20. Further, the spring arm 321 of the resilient member 32 will force the second arm 312 to rotate the lock member 31 about the pivotal portion 310 in a first rotating direction R1. Accordingly, the first arm 311 of the lock member 31 is rotated to engage with the stopping structure 21, such that the whole latching mechanism 3 is engaged and prevents the latching cover 30 from moving along a second sliding direction X2 opposite to the first sliding direction X1. In such a manner, the latching cover 30 is fixed in the lock position for allowing the latching retention tab 309 to stably engaging the battery module 1 in the lock position.

It should be noticed that a length of the first arm 311 is equal to a length of the second arm 312 of the lock member 31. In other words, the pivotal portion 310 is located in a gravity center of the lock member 31. Accordingly, when the whole latching mechanism 3 is engaged in the lock position and the casing 2 is applied by an impact, the impact will induce forces applied on the first arm 311 and the second arm 312. Due to design of equal length of the first arm 311 and the second arm 312, moments resulting from the forces induced by the impact will cancel each other out, and the whole latching mechanism 3 will be engaged in the lock position.

When the battery module 1 is desired to be replaced, the button portion 313 of the lock member 31 is pressed first. When the button portion 313 is pressed, the button portion 313 forces the second arm 312 to drive the lock member 31 to rotate about the pivotal portion 310 in a second rotating direction R2 opposite to the first rotating direction R1. Accordingly, the first arm 311 of the lock member 31 is rotated to disengage from the stopping structure 21. In other words, the whole latching mechanism 3 disengages from the casing 2 when the button portion 313 is pressed. Afterwards, the latching cover 30 is slid in the second sliding direction X2 to an unlock position shown in FIG. 7. As a result, the latching retention tabs 309 of the latching cover 30 disengages from the battery engaging slots 11 defined by the battery retention tabs 10 and the battery module 1 is able to be detached from the battery compartment 20 of the casing 2.

Compared to the prior art, when the latching cover slides to a lock position, the latching retention tabs of the latching cover engages with the battery engaging slots defined by the battery retention tabs, so as to prevent the battery module from separating from the battery compartment, and the spring arm of the resilient member will force the second arm to rotate the lock member about the pivotal portion in a first rotating direction. Accordingly, the first arm of the lock member is rotated to engage with the stopping structure, such that the whole latching mechanism is engaged and prevents the latching cover from moving. In such a manner, the latching cover is fixed in the lock position for allowing the latching retention tab to stably engaging the battery module in the lock position.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising:
   a battery module having at least one battery retention tab which defines at least one battery engaging slot;
   a casing whereon a battery compartment is formed, the battery module being detachably installed in the battery compartment, the casing having a stopping structure; and
   a latching mechanism slidably installed on the casing, comprising:
      a latching cover installed on the casing in a slidable manner and having at least one latching retention tab, the at least one latching retention tab engaging with the at least one battery engaging slot when the latching cover slides to a lock position, the at least one latching retention tab disengaging from the at least one battery engaging slot when the latching cover slides to an unlock position;
      a lock member comprising:
         a pivotal portion pivoted to the latching cover;
         a first arm protruding from the pivotal portion; and
         a second arm protruding from the pivotal portion and opposite to the first arm; and
      a resilient member installed on the latching cover, when the latching cover slides to the lock position, the resilient member forcing the second arm to rotate the lock member about the pivotal portion in a first rotating direction, such that the first arm is rotated to engage with the stopping structure, so as to fix the latching cover in the lock position.

2. The electronic device of claim 1, wherein an operating opening is formed on the latching cover, and the lock member further comprises:
   a button portion protruding from the second arm and exposing via the operating opening, when the button portion is pressed, the button portion forcing the second arm to drive the lock member to rotate about the pivotal portion in a second rotating direction opposite to the first rotating direction, such that the first arm is rotated to disengage from the stopping structure.

3. The electronic device of claim 1, wherein the latching cover having a pivotal structure, and the latching mechanism further comprises:
   a pivot member for pivoting the pivotal portion to the pivotal structure.

4. The electronic device of claim 1, wherein a length of the first arm is equal to a length of the second arm.

5. The electronic device of claim 1, wherein the latching mechanism further comprises:

a latching plate installing the latching cover on the casing and capable of moving with the latching cover, the latching plate and the latching cover cooperatively holding the resilient member.

6. The electronic device of claim 5, wherein a latch plate guiding channel is formed on the casing, the resilient member comprises a fixing portion and a spring arm protruding from the fixing portion and resiliently abutting against the second arm of the lock member, and the latching plate comprises:
   a plate body slidably disposed in the latch plate guiding channel; and
   a first combining portion extending from an end of the plate body and being combined with the fixing portion.

7. The electronic device of claim 6, wherein a first recessed portion and a first through bore communicating with the first recessed portion are formed on the latching cover, a through hole is formed on the fixing portion, a first threaded hole is formed on the first combining portion, and the latch mechanism further comprises:
   a first connecting member having a first head portion and a first threaded portion connected to the first head portion, the first head portion being contained in the first recessed portion and the first threaded portion being disposed through the first through bore and the through hole and screwed with the first threaded hole.

8. The electronic device of claim 7, wherein a second recessed portion and a second through bore communicating with the second recessed portion are formed on the latching cover, the latching plate further comprises a second combining portion extending from another end of the plate body, a second threaded hole is formed on the second combining portion, and the latch mechanism further comprises:
   a second connecting member having a second head portion and a second threaded portion connected to the second head portion, the second head portion being contained in the second recessed portion and the second threaded portion being disposed through the second through bore and screwed with the second threaded hole.

9. The electronic device of claim 8, wherein the first combining portion bends toward the plate body, such that a first engaging slot is defined between the plate body and the first combining portion, the second combining portion bends toward the plate body, such that a second engaging slot is defined between the plate body and the second combining portion, and the casing further has a first wall and a second wall, the first wall slidably engages with the first engaging slot, and the second wall slidably engages with the second engaging slot.

10. The electronic device of claim 1, wherein the casing further has a first top tab, a first bottom platform, a second top tab and a second bottom platform, a first latching cover guiding channel is defined between the first top tab and the first bottom platform, a second latching cover guiding channel is defined between the second top tab and the second bottom platform, and the latching cover further has a first sliding tab and a second sliding tab, the first sliding tab is slidably disposed in the first latching cover guiding channel, and the second sliding tab is slidably disposed in the second latching cover guiding channel.

11. An electronic device comprising:
   a battery module having at least one battery retention tab;
   a casing whereon a battery compartment and a latch plate guiding channel are formed, the battery module being detachably installed in the battery compartment, the casing having a first wall, a first top tab and a first bottom platform, a first latching cover guiding channel being defined between the first top tab and the first bottom platform; and a latching mechanism slidably installed on the casing, comprising:

a latching cover whereon a first recessed portion and a first through bore communicating with the first recessed portion are formed, the latching cover having a first sliding tab slidalby disposed in the first latching cover guiding channel;

a latching plate installing the latching cover on the casing, comprising:

a plate body slidably disposed in the latch plate guiding channel; and a first combining portion extending from an end of the plate body, a first threaded hole being formed on the first combining portion; and a first connecting member having a first head portion and a first threaded portion connected to the first head portion, the first head portion being contained in the first recessed portion and the first threaded portion being disposed through the first through bore and screwed with the first threaded hole.

12. The electronic device of claim 11, wherein the casing further has a second wall, a second top tab and a second bottom platform, a second latching cover guiding channel is defined between the second top tab and the second bottom platform, a second recessed portion and a second through bore communicating with the second recessed portion are formed on the latching cover, the latching cover further has a second sliding tab slidalby disposed in the second latching cover guiding channel, the latching plate further comprises a second combining portion extending from another end of the plate body, a second threaded hole is formed on the second combining portion, the latching mechanism further comprises:

a second connecting member having a second head portion and a second threaded portion connected to the second head portion, the second head portion being contained in the second recessed portion and the second threaded portion being disposed through the second through bore and screwed with the second threaded hole.

13. The electronic device of claim 12, wherein the first combining portion bends toward the plate body, such that a first engaging slot is defined between the plate body and the first combining portion, the second combining portion bends toward the plate body, such that a second engaging slot is defined between the plate body and the second combining portion, and the casing further has a first wall and a second wall, the first wall slidably engages with the first engaging slot, and the second wall slidably engages with the second engaging slot.

14. The electronic device of claim 13, wherein the casing further has a stopping structure connected to the second wall, and the latching mechanism further comprises:

a lock member comprising:

a pivotal portion pivoted to the latching cover;

a first arm protruding from the pivotal portion; and a second arm protruding from the pivotal portion and opposite to the first arm; and a resilient member installed on the latching cover, when the latching cover slides to a lock position, the resilient member forces the second arm to rotate the lock member about the pivotal portion in a first rotating direction, such that the first arm is rotated to engage with the stopping structure, so as to fix the latching cover in the lock position.

* * * * *